United States Patent
Kandogan et al.

(10) Patent No.: US 6,765,556 B2
(45) Date of Patent: Jul. 20, 2004

(54) TWO-KEY INPUT PER CHARACTER TEXT ENTRY APPARATUS AND METHOD

(75) Inventors: Eser Kandogan, San Jose, CA (US); Shumin Zhai, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 293 days.

(21) Appl. No.: 09/991,071

(22) Filed: Nov. 16, 2001

(65) Prior Publication Data

US 2003/0095104 A1 May 22, 2003

(51) Int. Cl.⁷ .................................................. G09G 5/00
(52) U.S. Cl. .................... 345/168; 345/169; 341/22; 341/23; 341/26; 379/52; 379/93.18; 379/93.27; 700/84; 700/89
(58) Field of Search ................................ 345/168, 169, 345/840; 341/9, 22, 23, 26, 176; 455/186.2; 463/30; 700/83, 84, 89; 379/354, 93.18, 93.27, 52

(56) References Cited

U.S. PATENT DOCUMENTS

| | | | | |
|---|---|---|---|---|
| 3,967,273 A | | 6/1976 | Knowlton | 340/365 S |
| 4,012,599 A | | 3/1977 | Meyer | 179/84 VF |
| 4,555,193 A | | 11/1985 | Stone | 400/486 |
| 4,585,908 A | | 4/1986 | Smith | 179/81 C |
| 4,825,464 A | * | 4/1989 | Wen | 379/354 |
| 4,927,279 A | | 5/1990 | Morgan | 400/486 |
| 5,058,046 A | | 10/1991 | Lapeyre | 364/709.16 |
| 5,392,338 A | * | 2/1995 | Danish et al. | 379/93.27 |
| 5,408,060 A | | 4/1995 | Muurinen | 200/314 |
| 5,452,960 A | | 9/1995 | Kuhlenschmidt | 400/487 |
| 5,477,262 A | | 12/1995 | Banker et al. | 348/7 |
| 5,818,437 A | * | 10/1998 | Grover et al. | 345/811 |
| 5,982,303 A | | 11/1999 | Smith | 341/22 |
| 6,011,554 A | | 1/2000 | King et al. | 345/352 |
| 6,043,761 A | | 3/2000 | Burrell, IV | 341/23 |
| 6,184,803 B1 | | 2/2001 | Burrell, IV | 341/22 |
| 6,205,342 B1 | | 3/2001 | Oakes et al. | 455/566 |
| 6,232,892 B1 | * | 5/2001 | Burrell, IV | 341/22 |
| 6,286,064 B1 | | 9/2001 | King et al. | 710/67 |

OTHER PUBLICATIONS

*Triangular Toggle Keys for Touch–Tone Phones*, IBM Technical Disclosure Bulletin, Jun. 1988, pp. 47–48.

M. Silfverberg et al., *Predicting Text Entry Speed on Mobile Phones*, Chi 2000, Apr. 1–6, 2000, pp. 9–16.

* cited by examiner

Primary Examiner—Henry N. Tran
(74) Attorney, Agent, or Firm—Daniel E. Johnson

(57) ABSTRACT

Letters (more generally, language symbols) are entered electronically by selecting, in sequential fashion, two keys on a standard phone layout. In preferred embodiments, the two keys in the sequence are located in the same row. The first key selected is that key on which the desired letter is displayed, and the second key is given by the spatial position of the desired letter within its group of letters on the key. The letters and keys may be color-coded to aid the user when inputting the two-key sequences. Letters may be selected to spell out words on a screen and then sent electronically to a remote device or recipient.

44 Claims, 12 Drawing Sheets

FIGURE 3

| letter to be selected | 1st key entry | 2nd key entry |
|---|---|---|
| A | 2 | 1 |
| B | 2 | 2 |
| C | 2 | 3 |
| D | 3 | 1 |
| E | 3 | 2 |
| F | 3 | 3 |
| G | 4 | 4 |
| H | 4 | 5 |
| I | 4 | 6 |
| J | 5 | 4 |
| K | 5 | 5 |
| L | 5 | 6 |
| M | 6 | 4 |
| N | 6 | 5 |
| O | 6 | 6 |
| P | 7 | 7 |
| R | 7 | 8 |
| S | 7 | 9 |
| T | 8 | 7 |
| U | 8 | 8 |
| V | 8 | 9 |
| W | 9 | 7 |
| X | 9 | 8 |
| Y | 9 | 9 |
| Q | 7 | * |
| Z | 9 | # |

FIGURE 5

| symbol to be selected | 1st key entry | 2nd key entry |
|---|---|---|
| ! | 1 | 1 |
| @ | 1 | 2 |
| $ | 1 | 3 |
| % | 1 | * |
| & | 1 | # |
| ( | 3 | * |
| ) | 3 | # |
| : | 4 | * |
| / | 6 | # |
| + | * | * |
| - | * | # |
| ? | 0 | * |
| " | 0 | # |
| . | # | * |
| , | # | # |
| * | * | 0 |
| # | # | 0 |

FIGURE 7

| letter to be selected | 1st key entry | 2nd key entry |
| --- | --- | --- |
| A | 2 | 2 |
| B | 2 | 5 |
| C | 2 | 8 |
| D | 3 | 3 |
| E | 3 | 6 |
| F | 3 | 9 |
| G | 4 | 1 |
| H | 4 | 4 |
| I | 4 | 7 |
| J | 5 | 2 |
| K | 5 | 5 |
| L | 5 | 8 |
| M | 6 | 3 |
| N | 6 | 6 |
| O | 6 | 9 |
| P | 7 | 1 |
| R | 7 | 4 |
| S | 7 | 7 |
| T | 8 | 2 |
| U | 8 | 5 |
| V | 8 | 8 |
| W | 9 | 3 |
| X | 9 | 6 |
| Y | 9 | 9 |
| Q | 7 | 0 |
| Z | 9 | 0 |

FIGURE 9

| letter to be selected | 1st key entry | 2nd key entry |
| --- | --- | --- |
| A | 2 | 2 |
| B | 2 | 5 |
| C | 2 | 8 |
| D | 3 | 3 |
| E | 3 | 6 |
| F | 3 | 9 |
| G | 4 | 1 |
| H | 4 | 4 |
| I | 4 | 7 |
| J | 5 | 2 |
| K | 5 | 5 |
| L | 5 | 8 |
| M | 6 | 3 |
| N | 6 | 6 |
| O | 6 | 9 |
| P | 7 | 1 |
| Q | 7 | 4 |
| R | 7 | 7 |
| S | 7 | * |
| T | 8 | 2 |
| U | 8 | 5 |
| V | 8 | 8 |
| W | 9 | 3 |
| X | 9 | 6 |
| Y | 9 | 9 |
| Z | 9 | # |

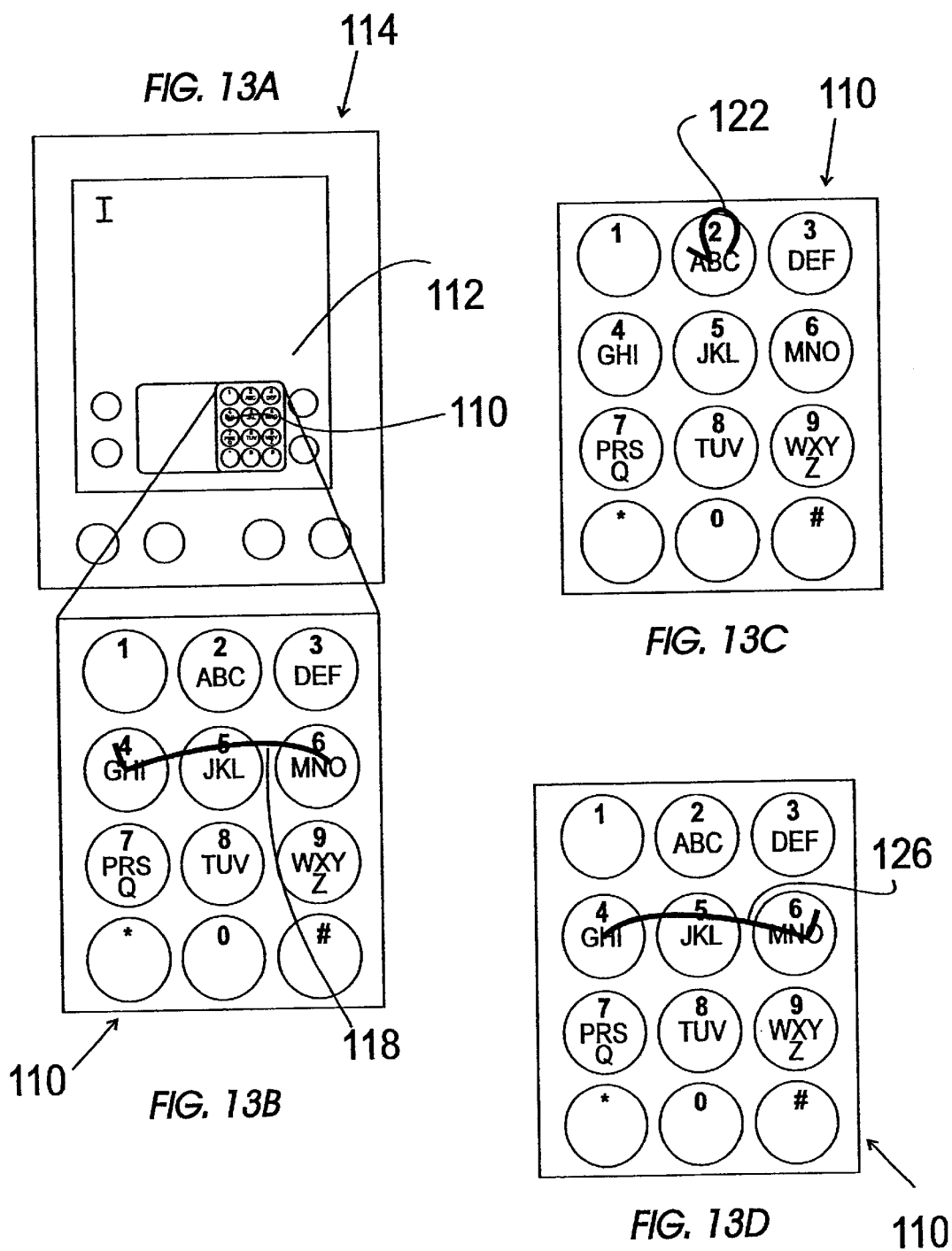

TWO-KEY INPUT PER CHARACTER TEXT ENTRY APPARATUS AND METHOD

TECHNICAL FIELD

The invention is in the field of alphanumeric keyboards. More particularly, the invention relates to the ability to enter letters on a phone keyboard by using two keys for each letter.

BACKGROUND

With the advent of the information age, composing text with the keys of telecommunication devices has become commonplace. For example, consumers are frequently called upon to spell out words using the keys of a phone pad. Entering text with phones has proven to be awkward, since there are many more letters (26 in the English alphabet) than keys on a standard phone keyboard (generally 12). This necessitates that more than one key be chosen to specify a single letter, thereby resulting in a relatively low text entry rate. The small size of the typical cell phone presents further special challenges, since both the size of the text input area and the number of any additional keys on the cell phone may be limited. While graphical keyboards with alternative key layouts are becoming more popular, the learning curve associated with their text input language can be steep.

FIG. 1 shows a phone layout 20 that includes 12 different keys designated by the numeral 24, which are arranged in 4 (horizontal) rows and 3 (vertical) columns. Ten of the keys 24 have a numeral (0, 1, 2, . . . 9) thereon, denoted by the numeral 28. In addition, the letters (denoted by the numeral 32) of the English alphabet, along with special symbols 36 (* and #), are displayed among the keys 24. The 26 letters of the English alphabet are distributed in alphabetically arranged groups among the numeral-bearing keys 2–9, with each of these groups including at least 3 letters. (The letters S and Z are conventionally assigned to the keys 7 and 9, respectively, although other configurations can be used, e.g., these letters may be displayed on the key 1.) Thus, the letters A, B, and C are assigned to the key 2, the letters D, E, and F are assigned to the key 3, and so on. While the conventional layout shown is not necessarily optimal for the purpose of text input, this layout and ones similar to it have nevertheless become the de facto phone layout standards, and are thus the layouts to which text entry methods and apparatuses conform. (Although the keys 24 shown in FIG. 1 are common to almost all phones, many cell phones include additional keys and switches for which there may be no common standard.)

In order to use one of the standard phone key layouts for text entry, it is necessary to use a technique that distinguishes or "disambiguates" which letter 32 on a given key 24 is the intended one, since a group of letters is generally assigned to a single key. One way of doing this is to algorithmically disambiguate letters with an electronic dictionary of common words (the so-called T-9 technique). In this technique, only one key is tapped for each letter, and a microprocessor or computer in communication with the keypad checks the dictionary to resolve any ambiguity. For example, entering the key sequence 9-WXYZ, 6-MNO, 7-PQRS, 5-JKL, 3-DEF, in that order, would result in the word "WORLD". However, this method requires a dictionary that may not contain special words (such as people and place names). Additionally, short words consisting of three or four letters can be difficult to disambiguate. Thus, entering the key sequence 4-GHI, 2-ABC, 6-MNO, 3-DEF could correspond to either the word "GAME" or "HAND". Accordingly, this method may require that the user pay close attention to the text as it is being generated and make any necessary corrections as he or she proceeds, thereby slowing the text entry rate.

Another disambiguation technique is the so-called multi-tap technique. In this technique, the number of taps on a given key specifies the desired letter by the ordering of the letters within the group of letters on the key being tapped. For example, tapping the key 2-abc just once produces the letter A, tapping this key twice produces the letter B, and tapping it three times produces the letter C. Since the number of taps varies from letter to letter, however, some users find this approach counterintuitive and unsatisfactory.

In a two-key sequence method, the user presses two keys consecutively to uniquely determine a letter or symbol. As discussed by M. Silfverberg et al., ("predicting text entry speed on mobile phones", Chi 2000, Apr. 1–6, 2000), the keys 1, 2, 3, and 4 can be used to disambiguate the intended letter on a key. For example, 7-PQRS followed by 1 corresponds to the letter P; 7-PQRS followed by the key 2 corresponds to the letter Q; 7-PQRS followed by the key 3 corresponds to the letter R; and 7-PQRS followed by the key 4 corresponds to the letter S. In another two-key sequence method taught by Burrell in U.S. Pat. No. 6,043,761, the keys *, 0, # are used to specify the intended letter within a group of letters. Thus, the letter J is input as 5*, the letter K as 50, and the letter L as 5#. Although these two-key sequence methods are conceptually straightforward, users may be frustrated that some of the two-key sequences involve keys at opposite ends of the keypad, which can result in a slow text entry rate.

Thus, there remains a need for a simple, time-efficient, easy-to-learn text entry method tailored to a standard key layout.

SUMMARY OF THE INVENTION

Methods and apparatuses are disclosed herein that involve two-keys per character text entry, in which two keys in a single row (or column) are used to specify each letter.

In one implementation of the invention, there is provided a method of selecting letters with a keyboard that is interfaced with an electronic component. The method includes providing a keyboard that includes a first, a second, and a third row of keys (in that order), with the rows being oriented along a first dimension, in which each of the numerals 1, 2, 3, 4, 5, 6, 7, 8, and 9 is displayed on a respective key. The first row includes three keys displaying the numerals 1, 2, and 3, respectively, in that order; the second row includes three keys displaying the numerals 4, 5, and 6, respectively, in that order; and the third row includes three keys displaying the numerals 7, 8, and 9, respectively, in that order. The key displaying the numeral 5 further displays a first language character, a second language character, and a third language character, and other the numeral-displaying keys each further display at least three language characters. The method further includes inputting the first character into the electronic component by selecting the numeral 5 key and then selecting the numeral 4 key; inputting the second character into the electronic component by selecting the numeral 5 key and then selecting the numeral 5 key again; and inputting the third character into the electronic component by selecting the numeral 5 key and then selecting the numeral 6 key. In a preferred implementation, other language characters are input into the electronic component using similar methodology, and the language characters are letters of the English alphabet.

In another implementation of the invention, there is provided a method of selecting letters with a keyboard that is interfaced with an electronic component. The method includes providing a keyboard that includes a first, a second, and a third row of keys (in that order), with the rows being oriented along a first dimension, and in which each of the numerals 1, 2, 3, 4, 5, 6, 7, 8, and 9 is displayed on a respective key. The first row includes three keys displaying the numerals 1, 2, and 3, respectively, in that order; the second row includes three keys displaying the numerals 4, 5, and 6, respectively, in that order; and the third row includes three keys displaying the numerals 7, 8, and 9, respectively, in that order. The key displaying the numeral 5 further displays a first language character, a second language character, and a third language character, and other ones of the numeral-displaying keys each further display at least three language characters. The method further includes inputting the first character into the electronic component by selecting the numeral 5 key and then selecting the numeral 2 key; inputting the second character into the electronic component by selecting the numeral 5 key and then selecting the numeral 5 key again; and inputting the third character into the electronic component by selecting the numeral 5 key and then selecting the numeral 8 key. In a preferred implementation, other language characters are input into the electronic component using similar methodology, and the language characters are letters of the English alphabet.

In one implementation of the invention, there is provided a method of selecting letters with a keyboard. The method includes providing a keyboard interfaced with an electronic component, with the keyboard including respective keys for displaying the numerals 0, 1, 2, 3, 4, 5, 6, 7, 8, and 9. Nine of these numeral-displaying keys are arranged in a 3×3 matrix of keys including first, second, and third rows (in that order) oriented along a first direction, and first, second, and third rows (in that order) oriented along a second direction. Each of the rows includes 3 keys, and each of 8 of the keys in the matrix displays thereon a group of at least three letters arranged alphabetically and occupying sequential first, second, and third spatial positions, respectively, along the first direction. This permits the first, second, and third letter positions to be associated with the first, second, and third rows oriented along the second direction, respectively. The method includes inputting a chosen letter into the electronic component by making two key selections, in which the key selected first is the key on which the chosen letter is displayed. The key selected second and the key on which the chosen letter is displayed share a common row oriented along the first direction, and the key selected second is located in that row oriented along the second direction that is associated with the position occupied by the chosen letter on its corresponding key. This two-key input approach is repeated for letters chosen from keys in at least 2 of the rows oriented along the first direction and letters chosen from keys in at least 2 of the rows oriented along the second direction.

One embodiment of the invention is an apparatus for selecting letters, in which the apparatus includes a keyboard. The keyboard includes respective keys for displaying the numerals 0 through 9 inclusive, in which 9 of the numeral-displaying keys are arranged in a 3×3 matrix of rows including first, second, and third rows arranged sequentially along a first direction and first, second, and third rows arranged sequentially along a second direction. Each of 8 of the keys in the matrix have displayed thereon a group of three letters arranged alphabetically that occupy sequential first, second, and third positions, respectively, along the first direction. The apparatus further includes an electronic device in communication with the keyboard, in which the device registers which keys on the keyboard are selected and includes instructions for converting sequences of two keys into letters. For certain letters displayed on keys in at least two of the rows along the first direction and for certain letters displayed on keys in at least two of the rows along the second direction, key sequences for a desired letter are given by a first key followed by a second key, in which the first key is given by that key on which the desired letter is displayed. The second key is given by that key formed by the intersection of two rows, wherein one of the two intersecting rows corresponds to that row oriented along the first direction that includes the key displaying the desired letter, and the other of the two intersecting rows corresponds to that row oriented along the second direction that bears the same sequential position as the position of the desired letter on its corresponding key.

There is further provided computer program products comprising computer readable media, in which the media include machine-readable instructions for carrying out the methods described herein.

BRIEF DESCRIPTION OF THE DRAWINGS

FIGS. 2A, 2B, and 2C, shows text being entered with a standard keyboard by using 2 keys to define each letter.

FIG. 3 gives a preferred set of coding sequences for the keyboard of FIG. 1.

FIG. 5 gives a preferred set of coding sequences for the keyboard of FIG. 4.

FIG. 7 gives a preferred set of coding sequences for the keyboard of FIG. 6.

FIG. 9 gives a preferred set of coding sequences for the keyboard of FIG. 8.

FIG. 11, which includes

FIG. 12, which includes

FIG. 13, which includes FIGS. 13A, 13B, 13C, and 13D shows how text may be entered onto a keypad using strokes (e.g., from a stylus).

DETAILED DESCRIPTION OF THE INVENTION

Figure 2:
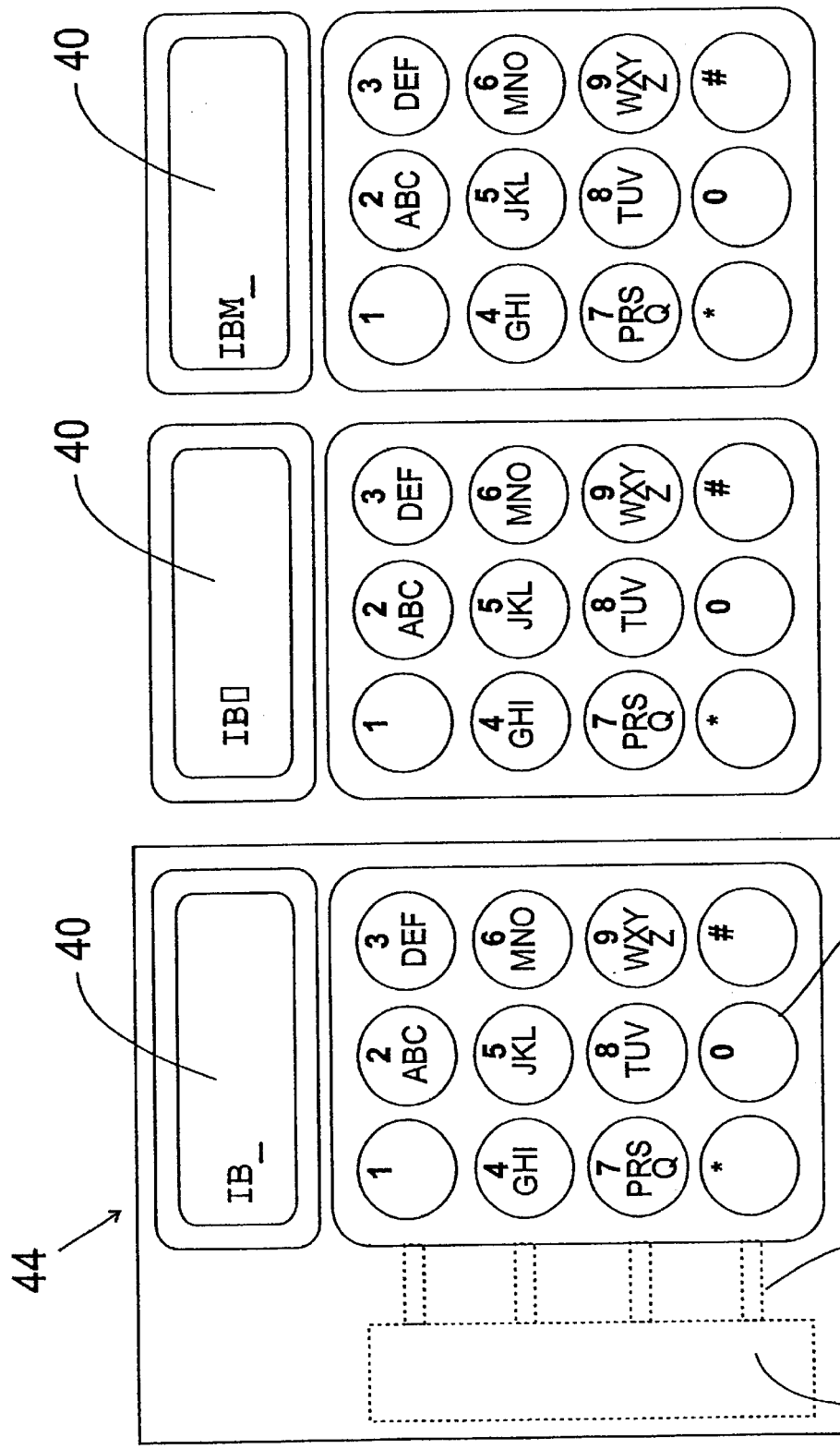
FIG. 2, which includes

Preferred implementations of the invention provide the user with the ability to conveniently enter text using only two key strokes. A first embodiment is described with respect to the standard layout shown in FIGS. 2A–C, in which letters are entered by selecting two keys that share a common row oriented along a particular dimension, for example, a horizontal row. (Alternatively, the two keys used to define a given letter may be located in the same column, as discussed below.) Although preferred embodiments herein are described with respect to English language letters and symbols, characters from any language may be used, such as those used in a writing system. As shown in FIG. 2A, a user has already entered the letters I and B onto a screen 40 of a communications device 44 (by selecting the combinations 4, 6; and 2, 2, respectively, as discussed below). FIGS. 2A–2C show how selecting the keys 6 and 4, in that order, defines a third letter, namely M, which then appears on the screen 40. As suggested by FIG. 2B, after the user has selected the key 6, but before selecting the key 4, the symbol ☐ appears, indicating to the user that another key selection is necessary to produce (define) a letter. As indicated in FIG. 2C, after the user selects the key 4, the letter M appear on the screen 40.

The keys 24 are each in electrical communication with an electronic component 48 such as a processor or a computer that records signals transmitted from the keys via wires 52 or the like to the processor. (The processor 48 and the wires 52 are not shown in FIGS. 2B and 2C for clarity.) The processor 48 contains instructions for converting key sequences into letters that are then displayed on the screen 40 and can later be sent electronically to a remote device. (Alternatively, the communication device 44 may not have a screen, i.e., the methods and apparatuses herein may be used to enter text electronically to a remote device over standard phone lines, such as when a caller spells out a name with the keys on a phone's keyboard, for example.)

In this embodiment, a consistent scheme is used, with each letter requiring two "taps" or key inputs. The first key to be inputted for a given letter is simply that key on which the letter appears; the second key in the sequence is in the same row as the first key and is given by the position of the given letter within its corresponding group of letters. Thus, the first key in the two-key sequence required for the letter I is the numeral 4 key. Since the letter I occupies the third spatial position (here: the right hand side) within its group of letters GHI on the numeral 4 key, the second key required to produce the letter I is that key in the third column of keys that shares a common row with the numeral 4 key (i.e., the numeral 6 key). Likewise, the letter B is selected by first selecting the numeral 2 key, and then selecting the numeral 2 key a second time (since the letter B occupies the second spatial position (here: the middle) within its group of letters ABC on the numeral 2 key, and the numeral 2 key is in the second column of keys). Finally, the letter M is input onto the screen 40 by first selecting the key on which the letter M appears (i.e., the numeral 6 key) followed by that key in the first column of the row that includes the numeral 6 key (i.e., the numeral 4 key), since the letter M appears in the first spatial position (here: the left hand side) within its group of letters MNO.

Figure 1:
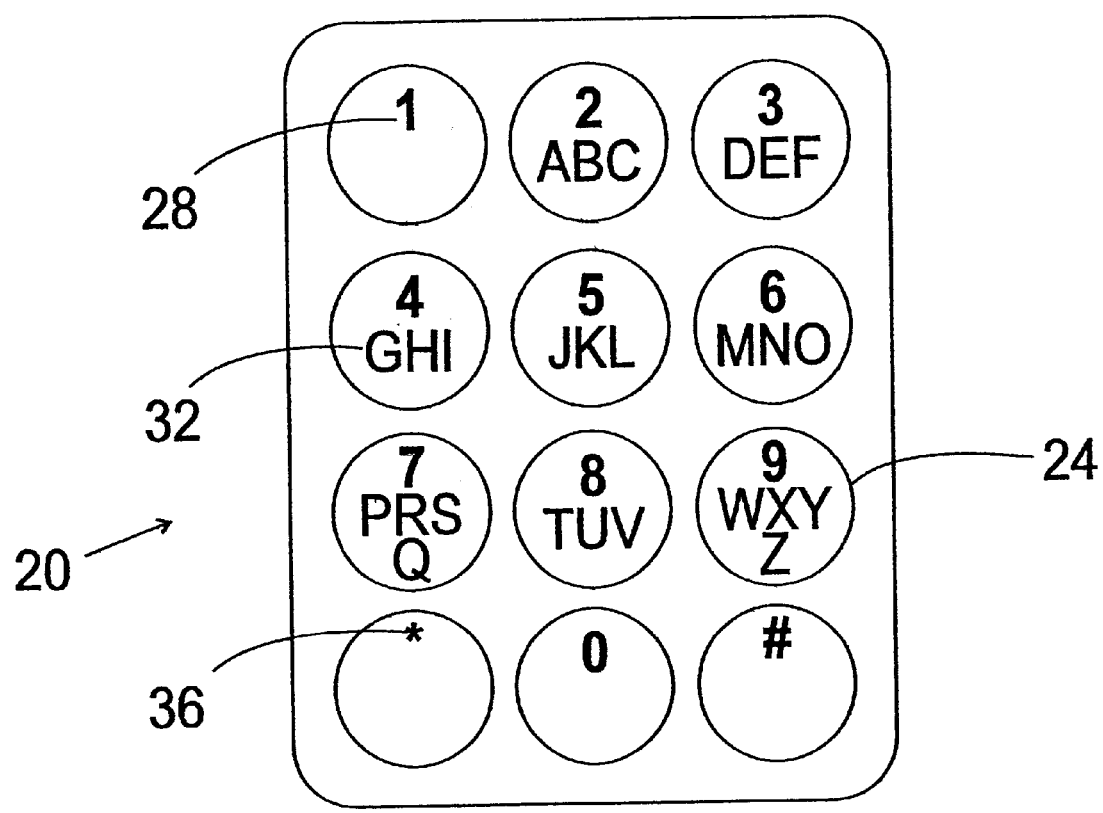
FIG. 1 shows a keypad (keyboard) having a standard layout, in which letters are laid out in groups of three or four on those keys displaying the numerals 2 through 9 inclusive.

Other letters are input using analogous methodology, as shown in FIG. 3, which lists all 26 letters of the English alphabet along with the two-key coding scheme of this particular method. The only exceptions to the pattern outlined here are with respect to the letters Q and Z, which are necessitated by the fact that these letters are included on the keys 7 and 9, respectively (see FIG. 1). For these 2 letters, the second key in the 2-key sequence is taken to be * and #, respectively, although other combinations for these letters may work well also. (For example, one may define Q by 7, 0; and Z by 9, 0. Alternatively, Q and Z may have more than one two-key sequence that defines them.)

An advantage of the key coding sequences of FIG. 3 is that the user enters letters by working within the same row, thereby reducing the time it takes to complete the two-key sequence, as a result of the shorter distance moved by the user's finger. Further, these sequences follow an intuitive, regular pattern, and therefore they are easier to execute. The pattern is such that a user can learn the two-key sequences well enough to be able to "type" in letters without even looking at the keys. Additionally, this two-key sequence methodology, as well as other methodologies herein, do not necessarily require any hardware changes, as it may be sufficient to load computer code onto an existing device, thereby programming the device to recognize two-key sequences as certain letters.

Numbers may be entered according to one of a number of methodologies. One is to have dedicated modes for entering numbers and letters, so that when the number mode is activated, depressing only a single key is needed to enter numbers. For example, the # key can be designated for this purpose, so that keys entered after it is depressed are interpreted as numbers. (In this case, the letter Z may be advantageously defined by a sequence that does not involve the # key.) According to this arrangement, the key sequence #, 1, 2, 3, 4 would produce the numbers 1, 2, 3, and 4 as text on the screen 40. In a similar fashion, # key can be used to switch back to letter mode from the number mode. An advantage to using a dedicated mode for numbers is that only one key is needed to produce numbers, rather than two, as in the case of letters. The user can be made aware of the mode currently in use through a visual indication to that effect. For example, the symbol used for the cursor (shown on the screen 40 in FIGS. 2A and 2B as an underscore __) can be changed to the # sign when the mode currently in use is the number mode, and then changed back to an underscore when the letter mode is the current mode. Alternatively, the word "number" or "letter" may be displayed in a corner of the screen 40, as appropriate.

Furthermore, mode switching between numbers and letters may in some embodiments be automatic. For example, if the user is prompted to enter a name (e.g., through menu selection), the default mode may advantageously be automatically set to letters rather than numbers. Likewise, if the user were prompted to enter a social security number, the default mode may advantageously be automatically set to numbers rather than letters.

Another way of entering numbers is a two-key coding approach that is similar in some respects to the one described above for entering letters. In one implementation, the key 0 (or another key, such as #) is used to indicate that the character being entered is a number. For example, to enter the number 1064, the user selects 1, 0 (to produce 1); 0, 0 (to produce 0); 6, 0 (to produce 6); and 4, 0 (to produce a 4). An advantage of this approach is that it is enjoys a certain consistency with the coding scheme used for letters, which are also defined by a sequence of two keys.

Figure 4:
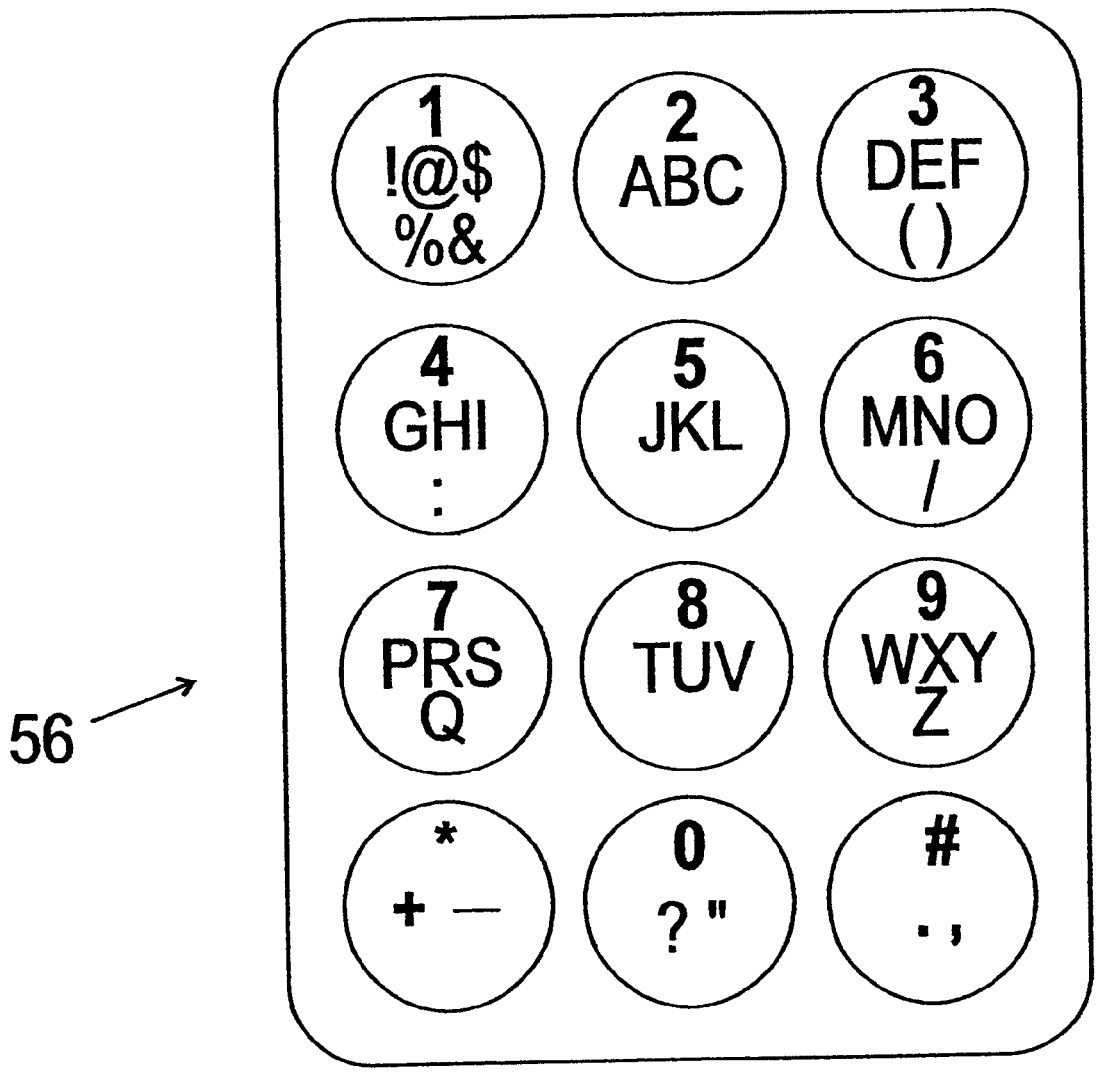
FIG. 4 shows a keyboard similar to the one of FIG. 1, but which includes several special symbols.

Although symbols are generally not included on standard key layouts, some symbols (such as @,/, and .) that are necessary for entering e-mail addresses, web addresses, etc. have begun to appear on cell phone layouts. One approach for addressing this need is by putting common symbols on underutilized keys such as 1, 0, *, and #. In this manner, at least 12 special symbols can be easily added to the layout of FIG. 1 to cover the most commonly used symbols. In another approach, a symbol is added to each key below the group of letters, with that symbol being entered as text by first selecting the key on which it is displayed, and then selecting the key below it (or above it). For example, to enter a symbol displayed underneath the group of letters ABC on the numeral 2 key, the user could hit the numeral 2 key followed by the numeral 5 key. Alternatively, dedicated modes, such as that described above with respect to the input of numbers, can be used. FIG. 4 shows a keypad or keyboard 56 with symbols displayed on a number of keys, and one preferred coding sequence for these symbols is outlined in FIG. 5.

Figure 6:
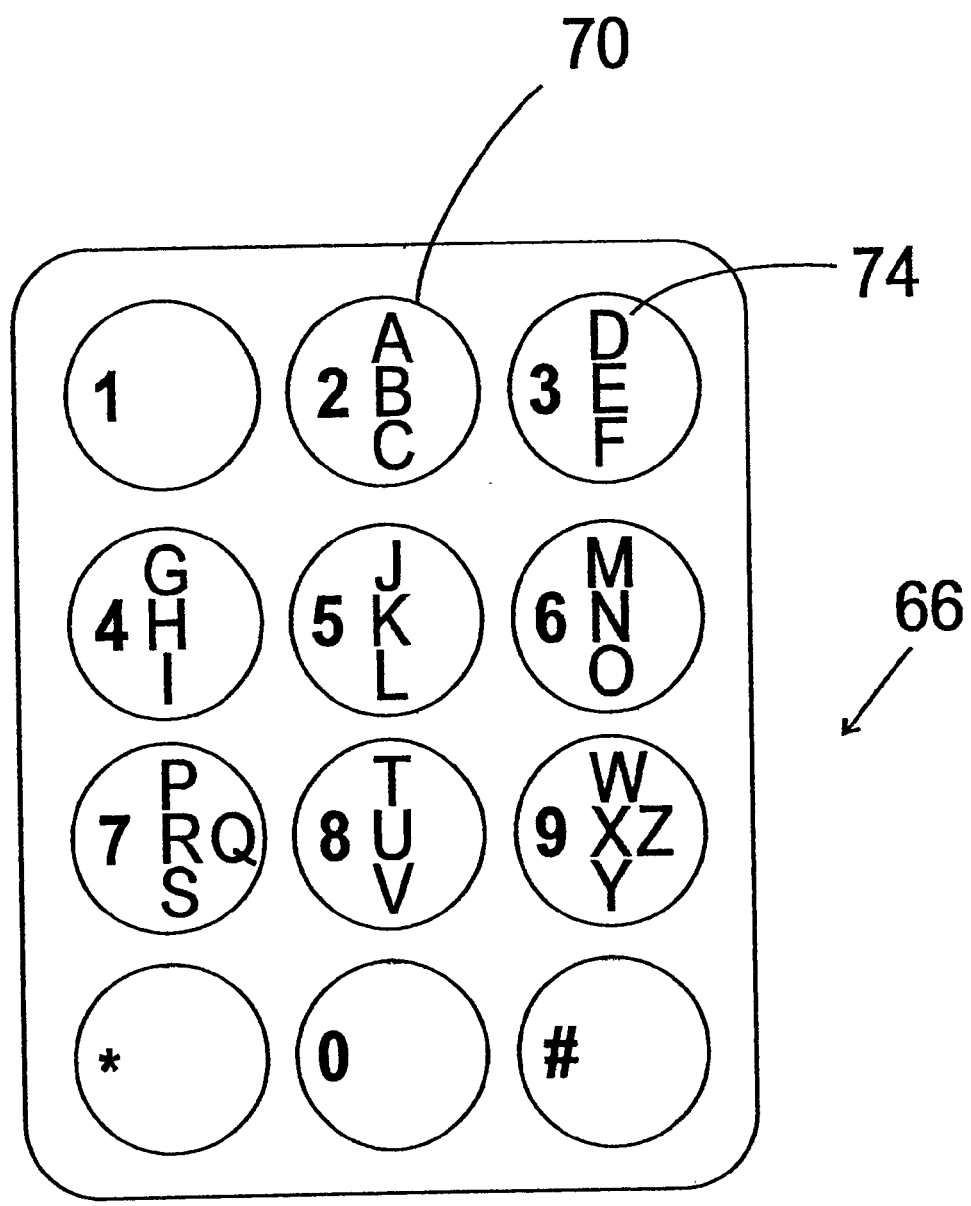
FIG. 6 shows a keyboard in which letters are arranged vertically on the keys displaying the numerals 2 through 9 inclusive.

Other embodiments are now described in which two keys located in the same column are used to define a given letter. This approach may be most appropriate for a layout such as the one shown in FIG. 6. Keyboard 66 includes a key 70 for each of the numerals 0–9 inclusive, with letters 74 of the English alphabet being displayed among the keys. These letters 74 are arranged in a top-to-bottom arrangement and occupy top, middle (center), and bottom spatial positions within their respective groupings. One preferred set of coding sequences that can be used with the keyboard 66 of FIG. 6 is given in FIG. 7. The letter J, for example, can be entered as text on a screen (not shown in FIG. 6) through the two-key sequence given by the numeral-displaying keys 5, 2. The first key in this sequence is simply the key on which the letter J is displayed (i.e., the numeral 5 key), and the second key in this sequence is in the first row (here: the top row) of the column in which the numeral 5 key resides (corresponding to the first spatial position (here: the top spatial position) of the letter J within its group of 3 letters JKL).

With respect to the embodiment of FIGS. 6 and 7, the first key in the two-key sequences for K and L is likewise simply the key on which those letters are displayed (i.e., the numeral 5 key). The letter K is selected through the sequence 5, 5. With respect to the second key in this sequence, the letter K occupies the second spatial position (here: the middle or center spatial position) within the group of letters JKL, and the numeral 5 key resides in the second row (here: the middle row) of keys within the 3×3 matrix of keys displaying the numerals 1–9. The letter L is selected through the sequence 5, 8. With respect to the second key in this sequence, the letter L occupies the third spatial position (here: the bottom spatial position) within the group of letters JKL, and the numeral 8 key resides in the third row (here: the bottom row) of keys within the 3×3 matrix of keys displaying the numerals 1–9.

In preferred embodiments herein, each of the numerals 0–9 is displayed on a respective key, and 8 of those keys have 3 (or more) letters displayed thereon. Variations on the letter coding sequences indicated in FIGS. 3 and 7 are possible without departing from the spirit of the invention. However, in preferred embodiments, it is generally the case that the spatial position of a letter within a group of letters on its respective key is associated with the second of two key selections that make up the coding sequence for that letter, whereas the first of the two key selections is given by the key on which the letter is displayed. (Exceptions can be made when it is advantageous to do so, for example, with the letters Q and Z.) Such a coding sequence arrangement is preferably used for letters on keys in each of 2 rows and for letters on keys in each of 2 columns, in which the rows and columns reside within a 3×3 matrix of numeral-displaying keys arranged in 3 rows and 3 columns.

Figure 8:
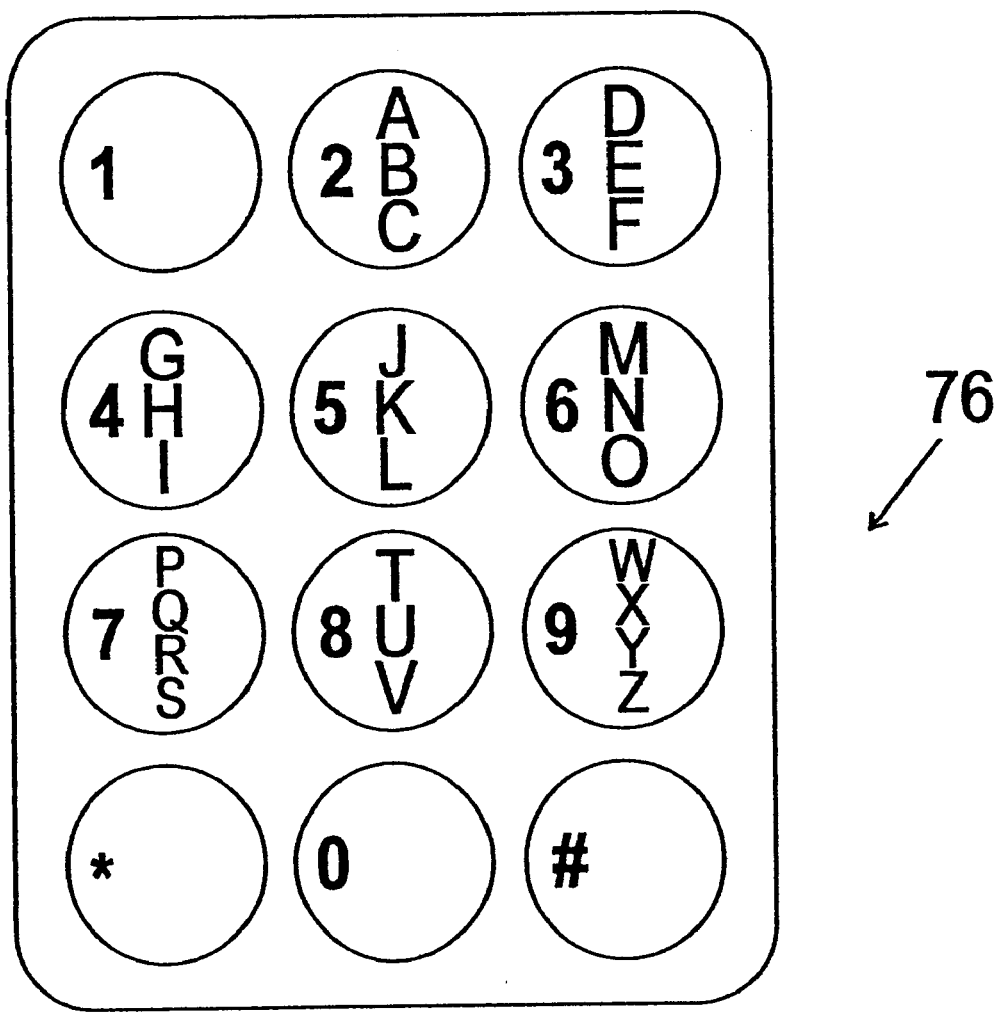
FIG. 8 shows another keyboard in which letters are arranged vertically on the keys displaying the numerals 2 through 9 inclusive.

Another embodiment is illustrated in FIG. 8, which has a keyboard that looks like the one shown in FIG. 6, except for the layout of the letters on the numeral 7 key and the numeral 9 key. A coding sequence that may be used for the embodiment of FIG. 8 is shown in FIG. 9, which differs from the coding sequence of FIG. 7 with respect to the letters Q, R, S, X, Y, and Z. This embodiment offers the user easy-to-learn coding sequences with respect to the letters on the numeral 7 and the numeral 9 keys: The second key in the 2-key sequence for a desired letter that occupies the fourth spatial position is advantageously that key in the fourth row of the column containing the key on which the desired letter is displayed (with the first, second, and third spatial positions likewise corresponding to the first, second, and third rows, respectively). In addition, the keyboard 76 may be advantageously adapted to include a number of symbols. For example, the total number of letters and symbols vertically displayed on several of the keys may be 4, and a 2-key sequence may be employed in which the first key selected is that key on which the desired letter (or symbol) is displayed, and the second key in the sequence is determined by whether the desired letter occupies the first, second, third, or fourth spatial position on its corresponding key.

Figure 10:
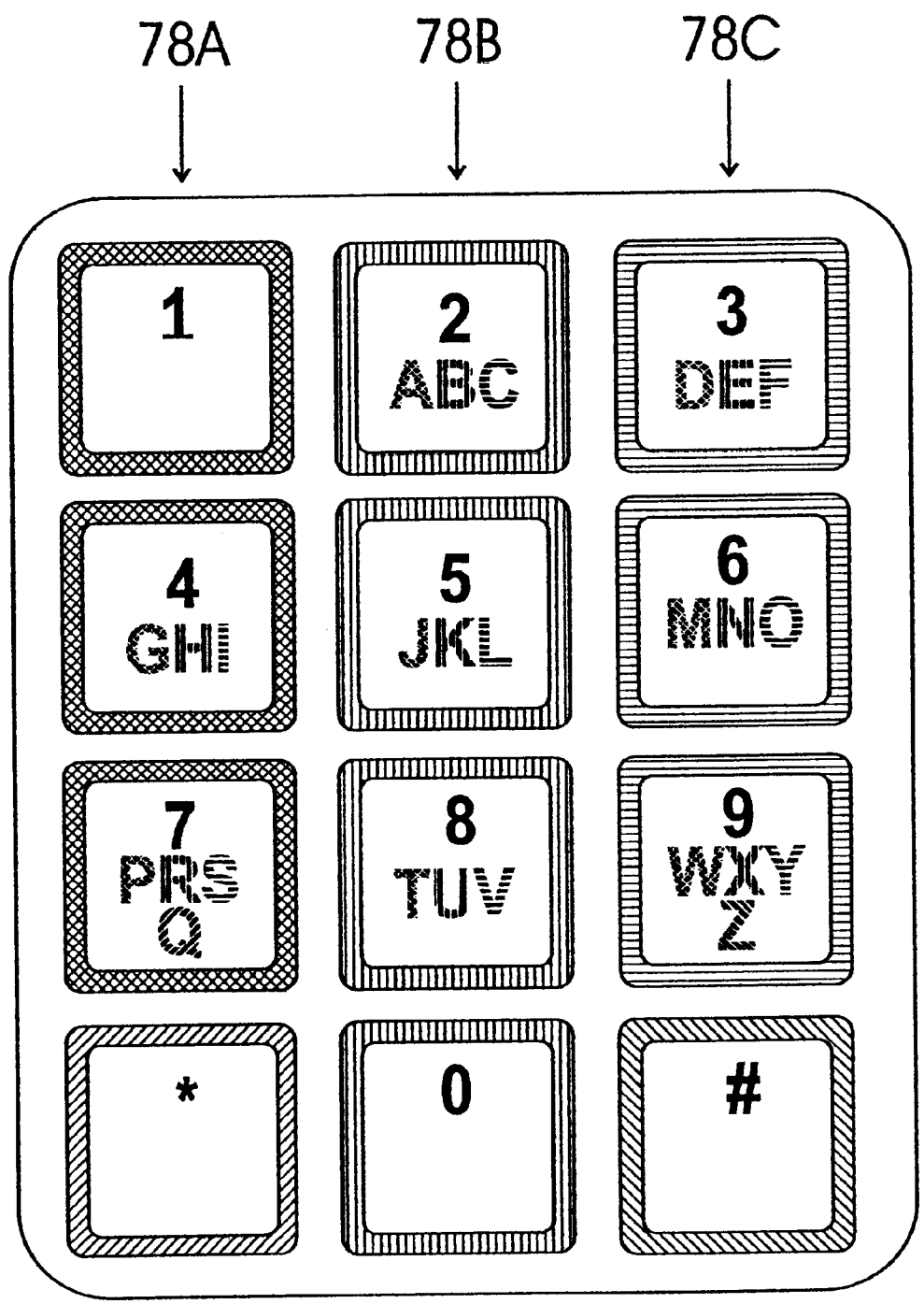
FIG. 10 shows a keyboard in which the letters and the keys are associated through markings that help the user input the appropriate sequence of keys for a given letter.

The text entry rate associated with the methodologies described herein may be increased through visual encoding or marking of the keys and letters. FIG. 10 shows a preferred method and apparatus for visual encoding, in which each column of keys is marked or "tagged" with a different color, such as yellow for the keys 1, 4, 7 (in a first column 78*a*), red for the keys 2, 5, 8 (in a second column 78*b*), and green for the keys 3, 6, 9 (in a third column 78*c*). Colors are indicated in FIG. 10 through the use of different cross hatching patterns. As indicated by the hatching patterns, the letters themselves are also advantageously colored so that they match the color of the second key in the two-key coding sequence. For example, the letters G, P, A, J, T, D, M, and W are colored yellow to match the keys 1, 4, and 7; the letters H, R, B, K, U, E, N, and X are colored red to match the keys 2, 5, and 8; and the letters I, S, C, L, V, F, O, and Y are colored green to match the keys 3, 6, and 9. Thus, each letter on a given key advantageously has a different color, and keys in different columns also have different colors, with the colors of the keys and the colors of the letters matching each other in accordance with the corresponding coding sequence. As indicated in FIG. 10, the letter Q and the * key may have matching colors (e.g., purple), and the letter Z and the # key may also have matching colors (e.g., pink). In preferred coloration embodiments herein, white and black may also be used as colors, and the number of colors used may be increased to accommodate special symbols. The coloration arrangement of FIG. 10 thus provides a strong visual cue that reinforces the coding sequences outlined in FIG. 3, thereby helping the user to rapidly and accurately select the appropriate coding sequence for a given letter.

In other embodiments, markings other than colors are used as an aid to selecting keys according to a given coding sequence. For example, the markings on the keys and letters may include matching patterns (instead of or in addition to colors), such as the very patterns in FIG. 10 used to represent different colors in the embodiment discussed above. In the case that patterns are used, one letter in each of the groups of three letters shown in FIG. 10 may be left "unpatterned", since the lack of a pattern may act to distinguish the unpatterned letter from those letters that have patterns. Thus, in one patternation embodiment that can be used with the key layout shown in FIG. 10, only two of the three letters have patterns associated with them.

Figure 11A:
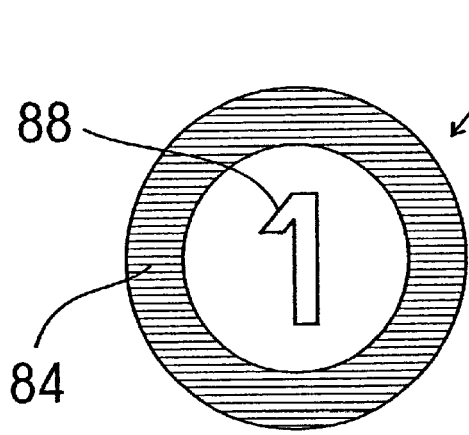
FIGS. 11A, 11B, 11C, and 11D, shows how markings can be placed in and around a key and its associated numeral.
Figure 11B:
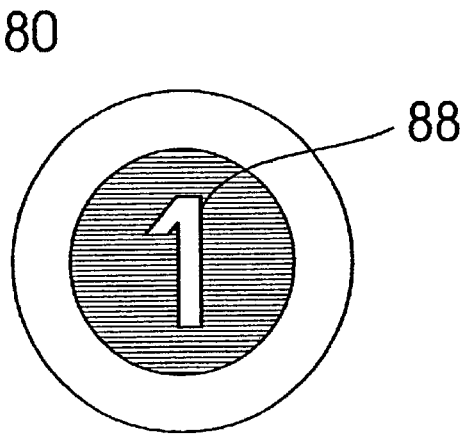
Figure 11C:
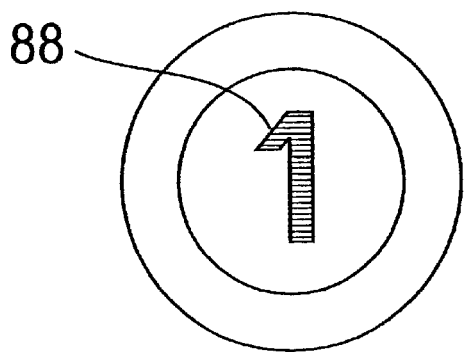
Figure 11D:
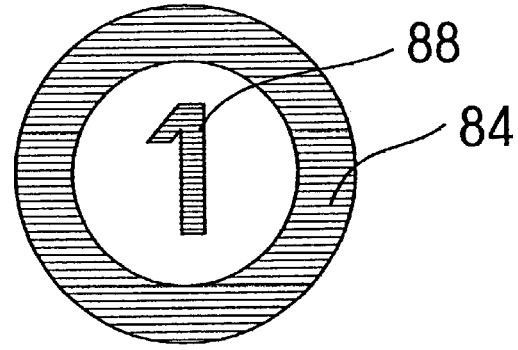

The markings of the keys and the letters, whether they be patterns or colors, can be laid out in different ways. FIGS. 11A–11D show various possibilities for marking a numeral-displaying key 80 (by way of example, the numeral 1 key). FIG. 11A shows a marked border region 84, which may either form part of (or surround) the key 80. In FIG. 11B, the key 80 itself (or a portion of it) is marked, and FIG. 11C illustrates how the numeral itself (designated by the numeral 88) may be marked. FIG. 11D illustrates a marking arrangement that combines the markings shown in FIGS. 11A and 11B.

Figure 12A:
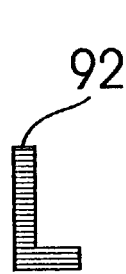
FIGS. 12A, 12B, and 12C, shows how markings can be placed in and around a letter.
Figure 12B:
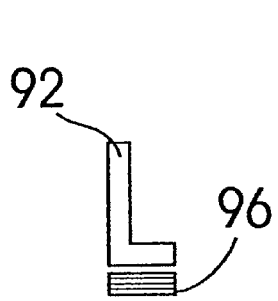
Figure 12C:
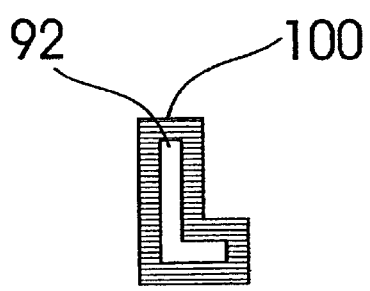

FIGS. 12A–12C illustrate how a letter 92 (by way of example, the letter L) can be marked. The letter 92 itself can be marked (to match the numeral 1 key) as in FIG. 12A. Alternatively, a marking 96 can be placed next to the letter 92 (as in FIG. 12B), or a marking 100 can be placed around the letter 92 (as shown in FIG. 12C).

In another preferred embodiment, the keys and letters of the keyboard 66 shown in FIG. 6 are tagged with markings such as colors, so that, for example, the coding sequence of FIG. 7 is reflected in the colors selected for the keys and the letters of the keyboard 66. Thus, the letters A, D, G, J, M, P, T, and W and the keys 1, 2, and 3 may marked with a first color (e.g., yellow); the letters B, E, H, K, N, R, U, and X and the keys 4, 5, and 6 may be marked with a second color (e.g., red); and the letters C, F, I, L, O, S, V, and Y and the keys 7, 8, and 9 may be marked with a third color (e.g., green). In addition, the letter Q and the * key may have matching colors (e.g., purple), and the letter Z and the # key may also have matching colors (e.g., pink).

For the embodiment of FIG. 8, the letters A, D, G, J, M, P, T, and W and the keys 1, 2, and 3 may be marked with a first color (e.g., yellow); the letters B, E, H, K, N, Q, U, and X and the keys 4, 5, and 6 may be a marked with a second color (e.g., red); the letters C, F, I, L, O, R, V, and Y and the keys 7, 8, and 9 may be marked with a third color (e.g., green); the letters S and Z and the keys *, 0, and # may be marked with a fourth color (e.g., blue).

In other embodiments, the keys 1, 2, 3, and 4 may each have a separate marking such as a particular color, and each of the letters on each of the keys may have a marking (e.g., a particular color) corresponding to one of the keys 1, 2, 3, 4. For example, the letters A, D, G, J, M, P, T, and W and the key 1 may have a first color such as yellow; the letters B, E, H, K, N, R, U, and X and the key 2 may have a second color such as red; the letters C, F, I, L, O, S, V, and Y and the letter 3 may have a third color such as green; and the letters Q and Z and the key 4 may have a fourth color such as purple. This marking arrangement advantageously corresponds to a key coding sequence in which letters are chosen by selecting two keys, with the first key being that key on which the desired letter is displayed, and the second key being the key 1, 2, 3, or 4 having a color matching that of the desired letter. Alternatively, the keys 7, 8, 9 (or 1, 7, 8, 9) may each have a separate marking (e.g., color) and be used to disambiguate the 3 (or more) letters within each group of letters on the keys. In other embodiments in which more than one key has a given color (or marking), the second key selected in the two-key sequence may be any one of the keys so colored.

The methods and apparatuses herein are not limited to traditional mechanical keyboards or keypads such as those used in household telephones, but may also be implemented on touch screens having "soft" buttons or keys, such as the one shown in FIG. 13A. With touch screens, key selections may be made with a stylus, so that letters may be "written" through stroking actions. For example, as shown in FIG. 13B, the letter I may be selected on a touch screen keypad 110 of a screen 112 (that is part of a personal communications device 114) by placing a stylus (not shown) on the key 4, followed by a long right stroke or arc 118 extending onto the key 6, and then taking the stylus off the key 6. The letter B can be formed by placing the stylus on the key 2 and then making an arc 122, e.g., a circle that begins and ends on the same key, but at some point goes outside the perimeter of the key, as shown in FIG. 13C. For the letter M, the stylus can be placed on the key 6, followed by a long left stroke or arc 126 extending onto the key 4, as shown in FIG. 13D. Two-key sequences such as these are consistent with the key coding sequences given in FIG. 3, for example.

The touch screen keypad 110 or keyboard may comprise thin glass panels positioned over a CRT or LCD display (not shown). The screen 112 may be a capacitive screen, so that touching the screen perturbs the electric field between the glass panels, resulting in voltage changes (e.g., at the corners of the screen) corresponding to the distance between the screen's corners and the point of contact. With this information, circuitry (including one or more electronic components, such as a microprocessor) in communication with the keyboard can calculate the position of the touched portion of the screen 112 and thereby deduce which key was touched. Alternatively, the touch screen 112 may be a resistive touchscreen that includes two conductive coated layers separated by nonconductive spacer dots. When pressure is applied to the screen, the conductive layers are urged closer together, thus creating a flow of current between the two layers at the contact point, which is then reported to the circuitry in communication with the keypad 110, so that the identity of the touched key can be ascertained.

In more traditional keypads or keyboards used with household phones and cell phones, the keys of the keypad may be interfaced with momentary contact push-button switches that in turn are connected to an electronic component such as a microprocessor that monitors the state of each switch. When the processor finds a circuit that is closed (i.e., when current flows through the circuit), the processor compares the location of that circuit to a table and finds the corresponding entry.

In preferred implementations, electronic circuitry (such as a microprocessor) in communication with a keyboard or keypad includes a buffer into which is input the identity of selected keys. The circuitry then converts key sequences into the appropriate letter or symbol in accordance with the corresponding key coding sequence. The electronic circuitry may include software or hardware for making such conversions. In preferred embodiments herein, letters or other language symbols identified by the electronic circuitry may be advantageously displayed on a display screen and/or sent to a remote electronic device (e.g., over the public telephone network or via wireless techniques).

In preferred embodiments of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A method of selecting letters with a keyboard that is interfaced with an electronic component, comprising:
   providing a keyboard that includes a first, a second, and a third row of keys, in that order, the rows being oriented along a first dimension, in which each of the numerals 1 through 9 inclusive is displayed on a respective key, wherein:

the first row includes three keys displaying the numerals 1, 2, and 3, respectively, in that order;

the second row includes three keys displaying the numerals 4, 5, and 6, respectively, in that order;

the third row includes three keys displaying the numerals 7, 8, and 9, respectively, in that order; and the key displaying the numeral 5 further displays a first language character, a second language character, and a third language character, and other ones of the numeral-displaying keys each further display at least three language characters; and inputting the first character into the electronic component by selecting the numeral 5 key and then selecting the numeral 4 key;

inputting the second character into the electronic component by selecting the numeral 5 key and then selecting the numeral 5 key again; and inputting the third character into the electronic component by selecting the numeral 5 key and then selecting the numeral 6 key.

2. The method of claim 1, wherein the characters include the letters of the English alphabet.

3. The method of claim 2, wherein the first letter is positioned on a portion of the numeral 5 key facing the numeral 4 key, and the third letter is positioned on a portion of the numeral 5 key facing the numeral 6 key.

4. The method of claim 2, said other 3-letter-displaying keys including the keys displaying the numerals 4 and 6, wherein the numeral 4 key displays a fourth letter, a fifth letter, and a sixth letter, respectively, and the numeral 6 key displays a seventh letter, an eighth letter, and a ninth letter, respectively.

5. The method of claim 4, further comprising:

inputting the fourth letter into the electronic component by selecting the numeral 4 key and then selecting the numeral 4 key again;

inputting the fifth letter into the electronic component by selecting the numeral 4 key and then selecting the numeral 5 key; and inputting the sixth letter into the electronic component by selecting the numeral 4 key and then selecting the numeral 6 key.

6. The method of claim 5, further comprising:

inputting the seventh letter into the electronic component by selecting the numeral 6 key and then selecting the numeral 4 key;

inputting the eighth letter into the electronic component by selecting the numeral 6 key and then selecting the numeral 5 key; and inputting the ninth letter into the electronic component by selecting the numeral 6 key and then selecting the numeral 6 key again.

7. The method of claim 6, wherein:

the first letter is positioned on a portion of the numeral 5 key facing the numeral 4 key, and the third letter is positioned on a portion of the numeral 5 key facing the numeral 6 key;

the fourth letter is positioned on a portion of the numeral 4 key facing away from the numeral 5 key, and the sixth letter is positioned on a portion of the numeral 4 key facing the numeral 5 key; and the seventh letter is positioned on a portion the numeral 6 key facing the numeral 5 key, and the ninth letter is positioned on a portion of the numeral 6 key facing away from the numeral 5 key.

8. The method of claim 7, wherein:

the first, second, and third letters are J, K, and L, respectively;

the fourth, fifth, and sixth letters are G, H, and I, respectively; and the seventh, eighth, and ninth letters are M, N, and O, respectively.

9. The method of claim 8, wherein:

the numeral 2 key has the letters A, B, and C displayed thereon, the letters A, B, and C being input into the electronic component by selecting, in order, the keys displaying the numerals 2, 1; 2, 2; and 2, 3, respectively;

the numeral 3 key has the letters D, E, and F displayed thereon, the letters D, E, and F being input into the electronic component by selecting, in order, the keys displaying the numerals 3, 1; 3, 2; and 3, 3, respectively;

the numeral 7 key has the letters P, R, and S displayed thereon, the letters P, R, and S being input into the electronic component by selecting, in order, the keys displaying the numerals 7, 7; 7, 8; and 7, 9, respectively;

the numeral 8 key has the letters T, U, and V displayed thereon, the letters T, U, and V being input into the electronic component by selecting, in order, the keys displaying the numerals 8, 7; 8, 8; and 8, 9, respectively; and the numeral 9 key has the letters W, X, and Y displayed thereon, the letters W, X, and Y being input into the electronic component by selecting, in order, the keys displaying the numerals 9, 7; 9, 8; and 9, 9, respectively.

10. The method of claim 9, wherein:

the keys displaying the numerals 1, 4, and 7 form a first row of keys oriented along a second dimension;

the keys displaying the numerals 2, 5, and 8 form a second row of keys oriented along a second dimension;

the keys displaying the numerals 3, 6, and 9 form a third row of keys oriented along a second dimension;

the letters G and P are disposed on respective portions of the 4 and 7 keys facing away from the second row oriented along the second dimension;

the letters I and S are disposed on respective portions of the 4 and 7 keys facing the second row oriented along the second dimension;

the letters A, J, and T are disposed on respective portions of the 2, 5, and 8 keys facing the first row oriented along the second dimension;

the letters C, L, and V are disposed on respective portions of the 2, 5, and 8 keys facing the third row oriented along the second dimension;

the letters D, M, and W are disposed on respective portions of the 3, 6, and 9 keys facing the second row oriented along the second dimension; and the letters F, O, and Y are disposed on respective portions of the 3, 6, and 9 keys facing away from the second row oriented along the second dimension.

11. The method of claim 10, wherein the keyboard includes a row of keys oriented along the first dimension that includes a key having the numeral 0 disposed thereon.

12. The method of claim 7, further comprising:
forming text on a screen as letters are input into the electronic component; and
sending the text to a remote device electronically.

13. The method of claim 2, wherein letters are selected by depressing one key and then depressing another key in sequential fashion.

14. The method of claim 2, wherein the keyboard forms part of a touch screen and letters are selected by contacting keys with an object followed by a stroking action with the object.

15. A method of selecting letters with a keyboard that is interfaced with an electronic component, comprising:
providing a keyboard that includes a first, a second, and a third row of keys, in that order, the rows being oriented along a first dimension, in which each of the numerals 1 through 9 inclusive is displayed on a respective key, wherein:
the first row includes three keys displaying the numerals 1, 2, and 3, respectively, in that order;
the second row includes three keys displaying the numerals 4, 5, and 6, respectively, in that order;
the third row includes three keys displaying the numerals 7, 8, and 9, respectively, in that order; and
the key displaying the numeral 5 further displays a first language character, a second language character, and a third language character, and other ones of the numeral-displaying keys each further display at least three language characters; and
inputting the first character into the electronic component by selecting the numeral 5 key and then selecting the numeral 2 key;
inputting the second character into the electronic component by selecting the numeral 5 key and then selecting the numeral 5 key again; and
inputting the third character into the electronic component by selecting the numeral 5 key and then selecting the numeral 8 key.

16. The method of claim 15, wherein the characters include the letters of the English alphabet.

17. The method of claim 16, wherein the first letter is positioned on a portion of the numeral 5 key facing the numeral 2 key, and the third letter is positioned on a portion of the numeral 5 key facing the numeral 8 key.

18. The method of claim 16, said other 3-letter-displaying keys including the keys displaying the numerals 2 and 8, wherein the numeral 2 key displays a fourth letter, a fifth letter, and a sixth letter, respectively, and the numeral 8 key displays a seventh letter, an eighth letter, and a ninth letter, respectively.

19. The method of claim 18, further comprising:
inputting the fourth letter into the electronic component by selecting the numeral 2 key and then selecting the numeral 2 key again;
inputting the fifth letter into the electronic component by selecting the numeral 2 key and then selecting the numeral 5 key; and
inputting the sixth letter into the electronic component by selecting the numeral 2 key and then selecting the numeral 8 key.

20. The method of claim 19, further comprising:
inputting the seventh letter into the electronic component by selecting the numeral 8 key and then selecting the numeral 2 key;
inputting the eighth letter into the electronic component by selecting the numeral 8 key and then selecting the numeral 5 key; and
inputting the ninth letter into the electronic component by selecting the numeral 8 key and then selecting the numeral 8 key again.

21. The method of claim 20, wherein:
the first letter is positioned on a portion of the numeral 5 key facing the numeral 2 key, and the third letter is positioned on a portion of the numeral 5 key facing the numeral 8 key;
the fourth letter is positioned on a portion of the numeral 2 key facing away from the numeral 5 key, and the sixth letter is positioned on a portion of the numeral 2 key facing the numeral 5 key; and
the seventh letter is positioned on a portion the numeral 8 key facing the numeral 5 key, and the ninth letter is positioned on a portion of the numeral 8 key facing away from the numeral 5 key.

22. The method of claim 21, wherein:
the first, second, and third letters are J, K, and L, respectively;
the fourth, fifth, and sixth letters are A, B, and C, respectively; and
the seventh, eighth, and ninth letters are T, U, and V, respectively.

23. The method of claim 22, further comprising:
inputting the letters P, Q, and R into the electronic component by selecting, in order, the keys displaying the numerals 7, 1; 7, 4; and 7, 7, respectively; and
inputting the letters W, X, and Y into the electronic component by selecting, in order, the keys displaying the numerals 9, 3; 9, 6; and 9, 9, respectively.

24. The method of claim 23, further comprising:
inputting the letter S into the electronic component by selecting, in order, the key displaying the numeral 7 followed by a key that forms a row with the numeral 1 key, the numeral 4 key, and the numeral 7 key; and
inputting the letter Z into the electronic component by selecting, in order, the key displaying the numeral 9 followed by a key that forms a row with numeral 3 key, the numeral 6 key, and the numeral 9 key.

25. A method of selecting letters with a keyboard, comprising:
providing a keyboard interfaced with an electronic component, the keyboard including respective keys for displaying the numerals 0 through 9 inclusive, 9 of said numeral-displaying keys arranged in a 3×3 matrix of keys including first, second, and third rows (in that order) oriented along a first direction and first, second, and third rows (in that order) oriented along a second direction, each of said rows including 3 keys, each of 8 of the keys in the matrix having displayed thereon a group of at least three letters arranged alphabetically and occupying sequential first, second, and third spatial positions, respectively, along the first direction, thereby permitting the first, second, and third letter positions to be associated with the first, second, and third rows oriented along the second direction, respectively;
inputting a chosen letter into the electronic component by making two key selections, wherein:
the key selected first is the key on which the chosen letter is displayed; and
the key selected second and the key on which the chosen letter is displayed share a common row oriented along the first direction, and the key selected second is located in that row oriented along the second direction that is associated with the position occupied by the chosen letter on its corresponding key; and repeating said inputting for letters chosen from keys in at least 2 of the rows oriented along the first direction and letters chosen from keys in at least 2 of the rows oriented along the second direction.

26. The method of claim 25, wherein said chosen letters include letters from keys in each of the rows oriented along the first direction and further includes letters from keys in each of the rows oriented along the second direction.

27. The method of claim 26, wherein the rows along the first direction are oriented horizontally on the keyboard as rows, the rows along the second direction are oriented on the keyboard vertically as columns, and letters are displayed on the keys alphabetically from left to right.

28. The method of claim 27, wherein, for each key having exactly 3 letters displayed thereon, the 3 letters occupy a left, a middle, and a right position on their corresponding key, with the left, middle, and right letter positions being associated with the first, second, and third columns, respectively, with the key selected second located in the corresponding associated column.

29. The method of claim 26, wherein the rows along the second direction are oriented horizontally on the keyboard as rows, the rows along the first direction are oriented on the keyboard vertically as columns, and letters are displayed on the keys alphabetically from top to down.

30. The method of claim 29, wherein, for each key having exactly 3 letters displayed thereon, the 3 letters occupy a top, a middle, and a bottom position on their corresponding key, with the top, middle, and bottom letter positions being associated with the first, second, and third horizontal rows, respectively, with the key selected second located in the corresponding associated horizontal row.

31. The method of claim 26, wherein letters entered through key selections are displayed on a screen that is interfaced electronically with the electronic component.

32. The method of claim 31, further comprising:

composing text on the screen; and sending the composed text to a remote device.

33. The method of claim 26, wherein said 8 keys include the numeral 5 key, wherein the first, second, and third letters on the numeral 5 key are chosen by selecting the keys displaying the numerals 5, 4; 5, 5; and 5, 6, respectively.

34. The method of claim 26, wherein said 8 keys include the numeral 5 key, wherein the first, second, and third letters on the numeral 5 key are chosen by selecting the keys displaying the numerals 5, 2; 5, 5; and 5, 8, respectively.

35. An apparatus for selecting letters, comprising:

a keyboard, said keyboard including respective keys for displaying the numerals 0 through 9 inclusive, 9 of said numeral-displaying keys arranged in a 3×3 matrix of rows including first, second, and third rows arranged sequentially along a first direction and first, second, and third rows arranged sequentially along a second direction, each of 8 of said keys in said matrix having displayed thereon a group of three letters arranged alphabetically and occupying sequential first, second, and third positions, respectively, along the first direction; and an electronic device in communication with said keyboard, said device registering which keys on said keyboard are selected, said device including instructions for converting sequences of two keys into letters, wherein, for certain letters displayed on keys in at least two of said rows along the first direction and for certain letters displayed on keys in at least two of said rows along the second direction, key sequences for a desired letter are given by a first key followed by a second key, wherein:

the first key is given by that key on which the desired letter is displayed; and the second key is given by that key formed by the intersection of two rows, wherein one of said two intersecting rows corresponds to that row oriented along the first direction that includes the key displaying the desired letter, and the other of said two intersecting rows corresponds to that row oriented along the second direction that bears the same sequential position as the position of the desired letter on its corresponding key.

36. The apparatus of claim 35, wherein said certain letters include letters from each of said rows along the first direction and letters from each of said rows along the second direction.

37. The apparatus of claim 36, wherein the rows along the first direction appear on the keyboard as horizontally oriented rows, and the rows along the second direction appear on the keyboard as vertically oriented columns.

38. The apparatus of claim 37, said instructions including converting the sequences 5, 4; 5, 5; and 5, 6 into the letters J, K, and L, respectively.

39. The apparatus of claim 36, wherein the rows along the second direction appear on the keyboard as horizontally oriented rows, and the rows along the first direction appear on the keyboard as vertically oriented columns.

40. The apparatus of claim 39, said instructions including converting the sequences 5, 2; 5, 5; and 5, 8 into the letters J, K, and L, respectively.

41. The apparatus of claim 40, said instructions including converting the sequences 7, 1; 7, 4; 7, 7; 9, 3; 9, 6; and 9, 9 into the letters P, Q, R, W, X, and Y, respectively.

42. A computer program product comprising a computer readable medium, the medium including machine-readable instructions for carrying out the method of claim 25.

43. A computer program product comprising a computer readable medium, the medium including machine-readable instructions for carrying out the method of claim 1.

44. A computer program product comprising a computer readable medium, the medium including machine-readable instructions for carrying out the method of claim 15.

* * * * *